United States Patent [19]
Micali

[11] Patent Number: 5,499,296
[45] Date of Patent: Mar. 12, 1996

[54] NATURAL INPUT ENCRYPTION AND METHOD OF USE

[76] Inventor: Silvio Micali, 459 Chestnut Hill Ave., Brookline, Mass. 02146

[21] Appl. No.: 294,178

[22] Filed: Aug. 22, 1994

[51] Int. Cl.[6] ....................................... H04K 1/00
[52] U.S. Cl. ................... 380/23; 380/4; 380/49
[58] Field of Search ..................... 380/4, 23, 24, 380/25, 49, 52

[56] References Cited

U.S. PATENT DOCUMENTS

| | | | |
|---|---|---|---|
| 5,222,138 | 6/1993 | Balabon et al. | 380/23 |
| 5,239,557 | 8/1993 | Dent | 375/1 |
| 5,276,737 | 1/1994 | Micali . | |
| 5,293,633 | 3/1994 | Robbins | 455/3.1 |
| 5,315,638 | 5/1994 | Micali . | |

OTHER PUBLICATIONS

"Escrowed Encryption Standard (EES)" FIPS Pub 185 Feb. 9, 1994.

Primary Examiner—David C. Cain
Attorney, Agent, or Firm—David H. Judson

[57] ABSTRACT

Secure devices (e.g., a cryptophone, a cryptofax, a computer or other such electronic device) have an encryptor and a digitizer, the digitizer for receiving an input and generating an output supplied to the encryptor. According to the invention, the encryptor and the digitizer are coupled either physically, logically or through non-tamperable software to guarantee that a given ciphertext is the encryption, generated by the encryptor, of an output generated by the digitizer.

19 Claims, 1 Drawing Sheet

NATURAL INPUT ENCRYPTION AND METHOD OF USE

TECHNICAL FIELD

This invention relates generally to encryption methods and more specifically to a method for firmly guaranteeing that a given ciphertext has been produced by an approved cryptosystem.

BACKGROUND OF THE INVENTION

Encryption can enhance the privacy of law-abiding citizens in their use of phones, faxes, computers and other devices It is also well recognized, however, that encryption may be misused in a variety of ways by criminals, spies and terrorists who wish to communicate to avoid being understood through legitimate wiretapping.

Various technologies have been considered in the past to make encryption compatible with law enforcement. For instance, one might envisage allowing only cryptosystems that are sufficiently "weak," so that all ciphertext they produce may be decrypted by the proper authority without extraordinary computational efforts. Alternatively, one may recommend using cryptosystems that are quite strong, but only with sufficiently short secret keys. Another approach, which is described in U.S. Pat. Nos. 5,276,737 and 5,315, 658 ("Fair Cryptosystems), as in the U.S. Government's Clipper Chip program, envisions cryptosystems where trustees hold pieces of information that are guaranteed to contain correct pieces of decryption keys. Thus, although a single trustee may not be able to reconstruct a single secret key, any relevant secret key may be reconstructed by the trustees taken collectively.

There is, however, a different type of problem unsolved by all these technologies: firmly guaranteeing that a given ciphertext has indeed been produced by the approved cryptosystems. This is a very important problem, and it will become even more so when, due to the spread of cryptography, millions of ciphertexts will be generated every day. Ciphertexts generated by Government-approved devices (such as the Clipper Chip) should not be a significant concern for law enforcement because the approved devices will make use either of either weak cryptosystems, of strong cryptosystems with a short key, or of key-escrow systems; therefore, agencies implementing such devices know, under the circumstances envisioned by the law, that the meaning of those ciphertexts will become intelligible. Instead, law enforcement agencies will be concerned about those ciphertexts that have not been produced by Government-approved systems, because such agencies will never be able to understand them, no matter how many court orders for wiretapping are implemented.

Nonetheless, it would be desirable to law enforcement if these "alternative" ciphertexts could be easily distinguished from the "standard" ones. In such case, the law enforcement agency would be more aware that a given person X goes out of his way (possibly incurring great inconvenience and great costs) to use encryption equipment that is not Government-approved and that the person does so in order not to be understood, even in the legitimate circumstances envisioned by the law. But if alternative ciphertexts can be made to be indistinguishable from standard ones, such persons may never be exposed since their encrypted traffic will perfectly "blend in" with that of millions of legitimate users.

The gravity of this problem may not be underestimated. If not adequately prevented, the indistinguishability of ciphertexts produced by approved and non-approved cryptosystems will be a major criminal threat. Some proposed solutions to this crucial problem are discussed below.

One tentative solution (discussed both by Fair Cryptosystems and the Clipper Chip) consists of putting the chosen encryption algorithm in a secure or tamper-proof piece of hardware; e.g., a chip (some portion of) which cannot be read from the outside and cannot be tampered with (since any tampering would result in destroying the information protected inside). This approach has some important advantages. For instance, use of tamper-proof hardware makes it impossible for an adversary to use the chosen cryptosystem with a new secret key. Thus, if the adversary really wants to use a different key, he must also get hold of a different piece of encryption equipment, which may be difficult. Indeed, it is conceivable that Government-approved, inexpensive encryption hardware will be readily available or part of telephones, faxes, computers and other devices. On the other hand, finding or having manufactured "alternative" and ad hoc encryption equipment may be sufficiently inconvenient for most adversaries. Indeed, it would be very desirable if law-abiding citizens could legitimately use encryption with great ease, while criminals could misuse encryption only at the price of great inconvenience.

A second approach (also addressed in Fair Cryptosystems and the Clipper Chip) envisions that the secure hardware containing the chosen cryptosystem also contains (possibly in addition to the user's secret key) a key K secret, but available to the proper authorities. The key K resides within the secure hardware and thus cannot be read from the outside. After the approved equipment produces a ciphertext C, a corresponding authentication tag T may be computed by means of this additional key. For instance, T may be a (preferably short) string computed as a function of C and K, and thus T cannot be computed by an adversary who does not use Government-approved encryption equipment, because he does not know the value of K. The key K need not be unique for all Government-approved devices, but could be device-specific. The advantage of this approach is that an adversary who encrypts without using the Government-approved devices may be detected. Indeed, if a spy encrypts his communications with a non-approved device, he cannot add the right authentication tags to the ciphertexts he produces. Thus, if encrypted communications are monitored, whenever a communication lacks the right tag, it will become clear that communication was produced by a non-approved device. Therefore, although the proper authorities may never be able to understand the meaning of that communication, it may be helpful to them to be aware of the presence of someone who goes out of his way, incurring great inconvenience, in order to avoid using Government-approved encryption devices.

These techniques, however, do not provide adequate proof that a given ciphertext has been provided by an approved piece of encryption equipment. In particular, they suffer from the so-called "double encryption" security problem. This problem can be described as follows. Assume two persons X and Y first encrypt a message M with a key known only to them (and possibly also with a cryptosystem of their own) so as to obtain a ciphertext M'. They then encrypt M' with a piece of Government-approved equipment so as to produce a second ciphertext M". By doing so, the two persons understand M. The recipient of M" may use the Government-approved system to retrieve M', and then the special system between X and Y to compute M from M'. To the contrary, if law enforcement officials legitimately try to recover M from M", they will fail. This is because while they can reconstruct M' from M", they cannot compute M from M' because M' is not an encryption of M obtained with the Government-approved system. Indeed, even if the Government-approved equipment produces authentication tags, the encrypted communications between X and Y will appear to-be totally legitimate—even though no law-enforcement officer will ever understand them.

Indeed, when X (or Y) feeds M' to the Government-approved encryption equipment, the equipment will produce not only M" but also a valid authentication tag T" for M". This is because such authentication tags "expose" only an adversary who never uses the Government-approved cryptosystem. But in a double-encryption attack, the enemy uses the Government-approved equipment, though in a special fashion. And it is well-known that the Clipper Chip, for example, is powerless against such double-encryption attacks.

BRIEF SUMMARY OF THE INVENTION

It is therefore a primary object of the present invention to be able to provide firm assurances that a given ciphertext has been honestly obtained by a given cryptosystem, regardless of the goals of that cryptosystem.

It is a more specific objective of the invention to develop cryptosystems such that any tampering with the cryptosystem, whether by double encryption of otherwise, will be detected.

It is still another object of the invention to provide new technology and methods that defeat double encryption attacks.

It is yet another object of the invention to exploit the natural forms of input typically supplied to an encryption algorithm to provide assurances that a given ciphertext generated by the algorithm has been produced by an approved cryptosystem. Such natural forms of input (e.g., a human voice) are supplied to a digitizer device that, in turn, supplies digitized information to an encryptor device or algorithm. According to the invention, the digitizer and the encryptor are "coupled" to each other either physically, logically or through non-tamperable software to achieve the desired objects.

A further object of the invention is to implement the above-identified objects using software code that can be executed for obtaining a legitimate output but at the same time cannot be tampered with without the enemy being detected.

These and other objects of the invention are preferably implemented in a secure device (e.g., a crypto-phone, a crypto-fax, a computer or other such electronic device) having an encryptor and a digitizer, the digitizer for receiving an input i and generating an output supplied to the encryptor. According to the invention, the encryptor and the digitizer are coupled either physically, logically or through non-tamperable software to guarantee that a given ciphertext is the encryption, generated by the encryptor, of an output generated by the digitizer.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawing in which.

DETAILED DESCRIPTION

Figure 1:
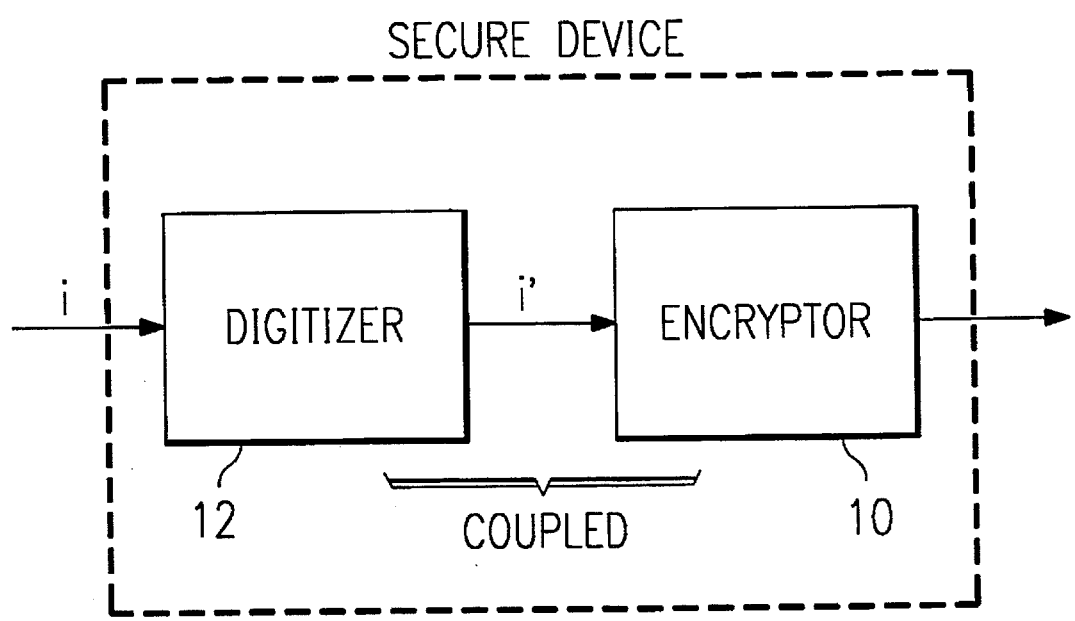
FIG. 1 is a representation of a secure device that implements the present invention.

The invention provides a way to give firm assurances that a given ciphertext has been honestly obtained by a given cryptosystem. This is achieved by "coupling" a digitizer, which responds to a natural form of input, to an encryptor, preferably supported in a tamper-proof area of a secure device. This technique solves the double encryption attack problem. It can be used with existing technology or with a key-escrow system.

As seen in FIG. 1, a secure device (e.g., a cryptophone, a cryptofax, a computer or other such electronic device) has an encryptor 10 and a digitizer 12, the digitizer for receiving an input i and generating an output supplied to the encryptor. According to the invention, the encryptor and the digitizer are coupled either physically, logically or through non-tamperable software to guarantee that a given ciphertext is the encryption, generated by the encryptor, of an output generated by the digitizer. The secure device is shown in FIG. 1 as including both the digitizer and the encryptor, although it should be appreciated that in some cases the secure device includes just the encryptor and the digitizer is located outside of the device. The present invention is also useful in such configurations.

In order to achieve the goals of the invention, it should be recognized initially that most encryption devices (e.g., secure telephones, faxes, and computers) have a natural form for their input. For instance, the natural input to be encrypted by a "cryptophone" is human voice, and more specifically spoken language. Thus, for simplicity, the inventive concepts will first be described in the context of telephone communications, although it should be appreciated that the invention is not limited to this particular application.

By way of background, assume that the cryptophone works in the following well-defined way. First, human voice is inputted to the phone. Normally, the voice signals are in analog format. The voice is then digitized into a stream of bits by a "digitizer." Typically, this stream of bits is fed to the encryption algorithm, which is contained in some secure hardware. This bit stream will then be encrypted (using a secret key) and the encrypted stream sent to the proper recipient where, after being decrypted, it will be transformed back to human voice. This sequence of events is conventional. This specific sequence, however, is exemplary, and other forms of "encryption" are also known, including using the encryption algorithm just to perturb an original analog signal.

The problems associated with using such prior art systems as described above are solved by "coupling" the digitizer to the encryptor in one of three novel ways. The first technique is to physically couple the digitizer and the encryptor through placement of these devices in the same tamper-proof area of the secure device. Alternatively, the invention envisions a combination of tamper-proof protection and "digital" protection, which allows the devices to be "logically" coupled. A third approach involves so-called "software" coupling between the two devices. Each of these approaches will be discussed below.

Physical Coupling

According to one embodiment of the present invention, the voice digitizer is placed in the same tamper-proof area in which the encryptor (i.e., at least a portion thereof) resides. This is referred to hereinafter as a "physical" coupling of the digitizer and the encryptor. This approach also allows the secure device to make better use of authentication tags since the tags used in the prior art were subject to double encryption attack.

The digitizer is either a device (possibly employing an analog-signal representation) transforming sound (possibly including human voice) into a suitable input for the encryptor (e.g., without limitation, a stream of bits), or a device that receives as input an analog signal allegedly corresponding to sounds that may include human voice, and puts it into a suitable input form for the encryptor. If the encryptor is capable of operating on analog signals directly, the digitizer may not transform its input signals at all. For instance, the digitizer may just check that its input signals satisfy certain given properties.

By supporting the digitizer in the same tamper-proof hardware containing the encryption algorithm, a tight coupling is achieved between the output of the digitizer and the encryptor. This provides significant advantages because one cannot feed the encryption algorithm just any input; rather the encryption algorithm must receive only the output of the digitizer, which in turn only accepts as an input natural sound or analog signals representing natural sound. Thus, in effect, an enemy faces a combined secure system whose only possible input is sound, or analog signals corresponding to sound.

This approach defeats a double encryption attack. This is because even if enemy X has encrypted a message M in his own way to obtain a ciphertext M', the enemy cannot feed M' to the combined system in order to obtain a second cipher M" and its corresponding authentication tag. The ciphertext M', in fact, cannot be fed directly to the encryptor, because the tamper-proof area tightly couples the encryptor to the digitizer, and the latter accepts only sound (or something representing sound) as an input. Thus, in order to convince the combined secure system to encrypt M' (so as to produce M" and a proper authentication tag), the enemy must do something much more difficult than just feeding M' to a Government-approved device: he must be able to produce a sound that properly digitizes to M'.

This task may be quite complex, both if the tamper-proof area of the combined system prevents the enemy from inputting anything other than sound to the combined system, or if the enemy can feed the combined system analogue signals directly. For example, if by means of several trials, a sound is found that digitizes exactly to M', recording this sound and playing it back into a cryptophone implementing the combined system may also cause the injection of some unwanted background noise; thus some string other than M' may actually be digitized within the tamper-proof area of the phone, and this string will ultimately prevent enemy X to deliver the right message M to his accomplice (because changing a bit in a ciphertext is likely to yield a totally different decryption).

Moreover, if the digitizer acts on analog signals, even if an enemy has some control on these signals, the digitizer can check that these signals possess proper properties. As noted above, since people are expected to speak in their cryptophones, the natural input for a cryptophone is human voice. Thus according to the invention it is desired that the digitizer (or other device in the tamper-proof area which may be considered to be part of the digitizer) preferably makes sure that its input sound or its analog input signals have some fundamental characteristics of human voice before passing the output of its own processing to the encryptor. If these fundamental characteristics are lacking, then no output may be produced by the combined system. Alternatively, the combined system, when the digitizer receives an input lacking certain properties of human voice, may still produce an output, but this output, rather than being an encryption of the "defective" input (sound or analog signal) just consists of that very input in the clear. In such case, the combined system prepones (or otherwise adds) to the input sound (that is generated without any modification) a proper signal alerting the recipient device that a non-encrypted portion is coming so that the recipient device will not attempt to decrypt it. Alternatively, an input lacking some given human-voice properties may still be encrypted by the combined system, but a special tag (rather than an ordinary one) will be produced, so as to alert the proper monitoring agent that what has just been encrypted is somewhat "defective."

Moreover, such "authentication" tags are preferably of varying types. For instance, when the combined system has a high degree of confidence that the input was human voice, it can produce a tag on inputs C (the ciphertext), K (the Government-known secret key), and (for example) the number "1"; if the degree of confidence is a bit lower, the tag may be produced with the same first two inputs, but with (for example) "2" instead of "1" as the third input, and so on. Indeed, the continued presence of special tags in the encrypted communications originating from a user X itself provides an alarm signal to the proper agents (e.g., monitoring devices).

In addition, if it is expected that these human sounds also belong to a natural language (e.g., English), it is desired to have the combined system perform some simple test that its input sound corresponds to English. For instance, without intending to be restrictive, it may check that the input sound consists of human utterances of English words (at least a good portion of the time). In addition, it may check that these words have a rudimentary grammatical structure. Moreover, because this checking device (or device enrichment) may reside in a tamper-proof area, the Government, or any other proper authority, may not reveal what type of checks the combined system may make.

The possibility of producing sounds (or, possibly, analog signals) that pass some possibly unknown human-voice checks and yet digitize to a specific target bit stream M', is extremely remote. Enemies X and Y may attempt to avoid this problem by agreeing beforehand that some arbitrary word (e.g, "cat" ) stands for 0 while another arbitrary word (e.g., "dog" ) stands for 1. Assume X desires to transfer the message M to Y without being understood by any third party. Then, as in the beginning of a double encryption attack, X may encrypt M (by a possible different encryption algorithm) and a key known solely to him and Y—so as to produce a ciphertext M'. Then he may transfer M' to Y, using a Government-approved secure telephone based on the combined secure system, by uttering alternatively "cats and dogs" until all the bits of M' have been transferred. Such a method, or any variation of it, does provide human voice to the secure combined system, but it is of course absolutely impractical due to its slowness and lack of automation.

Those skilled in the art will recognize that the combined system also applies to other crypto-enhanced devices, such as faxes and computers. For instance, in a cryptofax machine, the natural input is an image page. Thus the digitizer will transform an image page or a signal representing an image page (possibly after suitable checks) into a suitable input for the tightly-coupled encryptor, where in this embodiment this tight coupling is achieved by means of a suitable tamper-proof area. A Government-approved cryptofax implementing the combined system forces an enemy to feed only this type of inputs. Thus, an enemy who desires to use a cryptofax machine to send his own encryption, M', of his intended cleartext M, will also be unsuccessful. In particular, assume that an enemy wishes to force the encryptor to encrypt his own encryption M of some cleartext M. Then, if he intends to do so by inputting a suitably prepared fax-page to the cryptofax implementing the combined system, the enemy runs into the difficulty that what actually reaches the digitizer also depends on some uncontrollable factors (e.g., the precise angle in which the fax-page is fed to the fax).

Similarly, in a computer, the combined system may oblige an enemy to press certain keys on the keyboard in order to properly input his own encryption M' of some original cleartext M. This may be made additionally hard by the fact that certain bytes of M' may not correspond to any specific key in the keyboard. Actually keyboards could be manufactured to insure that this is the case. Indeed, in this application, the digitizer checks that each received byte corresponds to an existing key. If so, the system preferably also checks how natural the typing rhythm appears, or whether (at least much of the time) the bytes corresponding to existing character keys have too many consonants in a row, or consist of words in a natural language, and so on. Again, only at the price of a very slow rate and great expense and inconvenience (e.g., by typing "cat" for 0 and "dog" for 1) may two criminals abuse the combined system.

Logical Coupling

According to an alternate embodiment of the invention, it is not required that both the encryption algorithm and the digitizer be contained in the same physically protected (e.g., tamper-proof) area. This is just one way to achieve a tight coupling between the digitizer (and thus the natural external input to the system) and the encryptor. Such coupling may also be obtained by digital protection, or by a combination physical (e.g., tamper-proof area) and digital protection.

For example, each of the digitizer and the encryptor may have a portion physically protected in a tamper-proof area, but they may be totally separate from each other. In this embodiment, there is a digitizer 12 and an encryptor 10, which may also produce authentication tags for its ciphertexts. After receiving and inspecting its own input, i, the digitizer passes a corresponding suitable output i' to the encryptor (where i' may at times coincide with i), but in a way that guarantees the encryptor that i' is indeed coming from (and/or has been checked by) the digitizer. Without intending to be restrictive, this guarantee of the genuineness of output i' is provided by the digitizer by sending the encryptor a digital signature of i' or another form of proof of authenticity. The digitizer may send the encryptor a signal that is a function of output i' and a common secret key between the digitizer and the encryptor. Upon receiving this information from the digitizer, the encryptor checks the digitizer's digital guarantee about i' and, if it is correct, encrypts output i'. It may also produce an authentication tag for this encryption.

In this manner, although no single tamper-proof area guarantees a secure and continuous channel of communication between the digitizer and the encryptor, there is nevertheless achieved the desired "coupling" of the encryptor and digitizer. This type of coupling is referred to hereinafter as "logically" coupling the encryptor and the digitizer, even though these devices may be distinct physical components.

Replacing physical protection with digital protection has certain advantages. Assume, for instance, that it is cheaper to manufacture two small tamper-proof areas than a single large one. Then, though one may still want to use a smaller tamper-proof area for protecting a portion of the digitizer and another for protecting a portion of the encryptor, the manufacturer can keep these two components separate but still "coupled" within the meaning of the invention. This is achieved by having the digitizer send digitally protected outputs to the encryptor. In another case, the invention may be implemented in existing devices that already include a physically protected encryptor, like for the Clipper Chip. In this case, it will be economical to keep the digitizer separate from the encryptor and achieve their tight coupling by digital protection. In addition, tightly coupling the encryptor and digitizer by digital protection has another advantage in that one may always use the same encryptor and change only the digitizer.

Software Coupling

A tight "coupling" of encryptor and digitizer is realized by means of specially designed algorithms. For instance, the digitizer is a public software algorithm that receives an input i, possibly make some checks on it, and then puts the input in a form i' suitable for the encryptor. Because no tamperproof area is used, it would seem easy for an enemy to feed the encryptor with inputs i' of his choice, rather than with values obtained by running the given digitizer algorithm. But according to the invention the digitizer algorithm will not only output i' (possibly after performing some checks on i), it may also output some form of digital signature of i'—e.g., it may also run a given algorithm S on inputs i' and a secret key K. For conceptual clarity, assume K is actually part of S, so as to obtain a new algorithm S'. Thus, whether or not S is publicly known, S' is de facto a secret algorithm, since at least its K portion is secret.

According to the invention, the digitizer is conceptualized as a group of three algorithms: a checking algorithm C (verifying whether an input i has some given properties), a transforming algorithm T (putting i in a suitable form i' for the encryptor), and a signature algorithm S' (whose outputs should convince the encryptor that i' was coming and was checked by the digitizer). If the digitizer algorithm is made public as the sequence of three distinct and individually public algorithms, the enemy can mount a double-encryption attack. However, this is not true if C, T, and S' are written in an interwoven and purposely complex way, and publicized only as a single piece of code. For instance, C, T, and S' may share variables and subroutines (so that it will not be clear which belong to which). Complex (yet artificial) redundancies may be introduced (e.g., without any limitation intended, special GO-TO loops). As another example, the third bit of a given intermediate value useful to C and S may never appear explicitly in running the program, but is only yielded as the sum modulo 2 of the second bit of one value and the tenth bit of another value. The same second bit, combined with something else, may yield a bit needed by T, and so on. As a result of these artificial complexities, while the digitizer is a public and executable piece of code, it will be very hard for an enemy to separate C, T and in particular S'. This goal is further facilitated by the fact that while one may have some ideas on what checks may be performed (indeed they may even be public knowledge), portions of S' are certainly totally unknown, as they contain a secret key, and the whole of S' itself, being a cryptographic function, is in any case a complex and unpredictable function involving a lot of "mixing and spreading" of data.

The net effect is that the digitizer's code is executable, but not tamperable, by an enemy. Indeed, there is little that an enemy can do to defeat the system. For instance, if the enemy directly feeds the encryptor an i' of his choice, he cannot produce its corresponding digital authorization because he is not capable of extracting S from the interwoven digitizer program. Even if an enemy succeeds in removing a redundant loop from the digitizer, he has not altered its input-output relation at all, and thus the modified digitizer will continue to produce perfectly legitimate outputs i' together with their guarantees of genuineness. If the enemy removes certain non-redundant operations or modifies certain bits of the outputs of the execution of the digitizer, he will produce an invalid signature for i'. Moreover, if i' is a binary string and so is its guarantee s', and if the bits of i' and s' are shuffled in complex ways known only to the encryptor, the enemy cannot choose his own i', let alone to produce the right corresponding s'.

In summary, having a simple piece of code (possibly realized in hardware) hidden inside some tamper-proof area, or having it in the open, but written in a totally unintelligible way, produces the same desired effect: a code that can only be executed as it is, without any undetected tampering.

The encryptor may also comprise such a special piece of software. Indeed, producing ciphertexts together with authentication tags produces outputs with digital guarantees of genuineness. If both the digitizer and the encryptor are realized by means of the above special software, they need not be kept (not even conceptually) separate. Indeed, one may write a single piece of software in the above special way such that the software receives inputs and then outputs encryptions of i together with their authentication tags. Indeed, if this public piece of software is not undetectably tamperable, the digitizer portion of this program is guaranteed to feed its proper outputs to the encrypting portion.

Finally, it should be realized that the above techniques are quite general. Indeed, given any algorithm A (not a digitizer), one can choose a proper digital guaranteeing algorithm S, and interweave it with A so as to generate a single algorithm A', producing the same outputs as A does, but together with corresponding digital guarantees, such that S cannot be extracted out from A'. This technique yields a tight coupling between digitizers and encryptors, but it may be useful in many different applications where it is desired to provide executable, yet non-tamperable, software code.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. In a secure device having an encryptor and a digitizer, the digitizer for receiving an input i and generating an output supplied to the encryptor, the improvement comprising:

coupling the encryptor to the digitizer in such a manner as to guarantee that a given ciphertext is the encryption, generated by the encryptor, of an output i', generated by the digitizer.

2. In the secure device as described in claim 1 wherein the encryptor is located within a tamper-proof area of the secure device.

3. In the secure device as described in claim 2 wherein the coupling between the encryptor and the digitizer is achieved by locating the digitizer in the tamper-proof area of the secure device.

4. In the secure device as described in claim 1 wherein the coupling between the encryptor and the digitizer is achieved by:

(a) having the digitizer send the encryptor a signal conveying the output i' and a guarantee that the output i' was produced by the digitizer;

(b) having the encryptor check the guarantee that the output i' was produced by the digitizer; and (c) having the encryptor encrypt the output i' if the check has been satisfied.

5. In the secure device as described in claim 4 wherein the signal depends on a secret key available to the digitizer and the encryptor.

6. In the secure device as described in claim 4 wherein the guarantee in the signal includes a digital signature.

7. In the secure device as described in claim 4 wherein a portion of the digitizer or the encryptor is contained in a tamper-proof area.

8. In the secure device as described in claim 7 wherein a portion of the digitizer or the encryptor is implemented in software not residing the tamper-proof area.

9. In the secure device as described in claim 7 wherein the digitizer software is written to insure that the software's input-output relation cannot be altered without being detected.

10. In the secure device as described in claim 1 wherein the encryptor outputs an encryption of input i together with an authentication tag.

11. In the secure device as described in claim 1 wherein the encryptor and the digitizer are coupled by implementing at least a portion of the digitizer using executable but non-tamperable code.

12. A method to guarantee that a given ciphertext is the encryption generated by a given encryptor of an output i' generated by a given digitizer, comprising the steps of:

locating the encryptor within a tamper-proof area of a secure device;

having the digitizer send output i' to the encryptor located within the tamper-proof area after checking that a given input i to the digitizer satisfies some given properties.

13. The method as described in claim 12 wherein the encryptor outputs the ciphertext together with an authentication tag.

14. The method as described in claim 13 wherein the authentication tag is dependent on a secret key.

15. The method as described in claim 12 wherein the encryptor is implemented in a cryptophone.

16. The method as described in claim 12 wherein the encryptor is implemented in a cryptofax.

17. The method as described in claim 12 wherein the encryptor is implemented in a computer.

18. A method to guarantee that a given output is generated by a given algorithm A comprising the steps of:

choosing an algorithm S capable of generating digital guarantees;

writing a single program P that, given any input i, outputs A(i), the output of A on input i, together with S(A(i)), a guarantee generated by S that A(i) is an output of A; and embedding into P one or more artificial complexities that make it harder for an enemy to recover S from P.

19. A method to guarantee that a given output is generated by a given algorithm A, comprising the steps of:

combining A and a digital-guarantee algorithm S to produce a public algorithm P such that, on any input x, public algorithm P outputs y, a correct output of algorithm A on input x, together with a string s guaranteeing that y is the output of algorithm A on input x; and embedding into P one or more artificial complexities that makes it hard for an enemy to compute an output pair (y,s) of P.

* * * * *